S. L. SHUSTER AND G. J. RIEGERT.
AUTOMOBILE POWER TRANSMITTING DEVICE.
APPLICATION FILED DEC 27, 1919.

1,389,167. Patented Aug. 30, 1921.
2 SHEETS—SHEET 1.

Witness:
R. E. Hamilton

INVENTORS;
Samuel L. Shuster
and Geo. J. Riegert,
BY
Chas. W. Gerard
their ATTORNEY.

S. L. SHUSTER AND G. J. RIEGERT.
AUTOMOBILE POWER TRANSMITTING DEVICE.
APPLICATION FILED DEC. 27, 1919.

1,389,167.

Patented Aug. 30, 1921.
2 SHEETS—SHEET 2.

Witness:
R. E. Hamilton

INVENTORS;
Samuel L. Shuster
and Geo. J. Riegert,
BY
Chas. W. Gerard.
their ATTORNEY.

UNITED STATES PATENT OFFICE.

SAMUEL L. SHUSTER AND GEORGE J. RIEGERT, OF ST. JOSEPH, MISSOURI.

AUTOMOBILE POWER-TRANSMITTING DEVICE.

1,389,167.      Specification of Letters Patent.      Patented Aug. 30, 1921.

Application filed December 27, 1919. Serial No. 347,823.

*To all whom it may concern:*

Be it known that we, SAMUEL L. SHUSTER and GEORGE J. RIEGERT, citizens of the United States, residing at St. Joseph, in the county of Buchanan, State of Missouri, have invented a certain new and useful Improvement in Automobile Power-Transmitting Devices, of which the following is a complete specification.

The present invention relates to automobile drive equipment, and aims to provide an improved power transmitting mechanism adapted to be associated in connection with the main drive shaft of the automobile for the purpose of utilizing a portion of the power transmitted by said shaft from the automobile engine for driving other machinery.

Accordingly we provide a sectional main drive-shaft, with one of said sections provided with a pair of sliding gear elements, adapted to be alternately engaged with a similar gear element upon a transverse shaft, through which the power from the main auto shaft is transmitted for the purpose of driving other machinery, one of said sliding gear elements being also movable into either neutral position or into clutched relation with the end of the other shaft section. It is also sought to provide a simple and efficient mechanism of the character described, and one in which special provision is made for maintaining the sections of the main auto drive shaft in true alinement.

With these general objects in view the invention will now be described by reference to the accompanying drawing illustrating one construction which we have devised for embodying the improvement, after which the novel features will be particularly set forth and claimed.

In the drawings—

Figure 4:
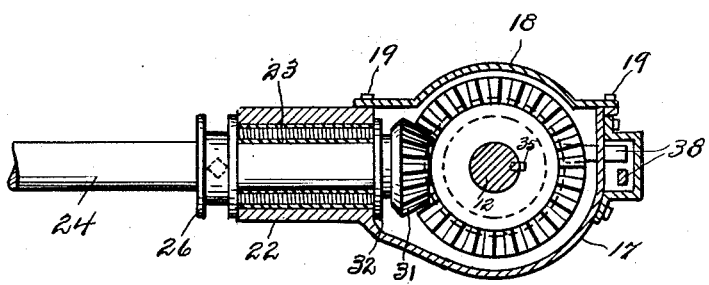
Figure 5:
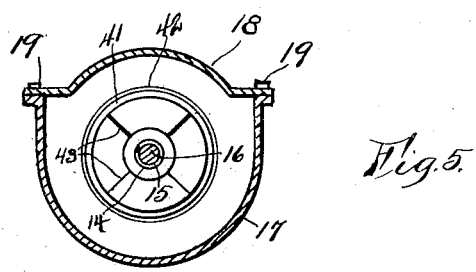
Figure 6:
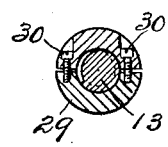
Figure 2:
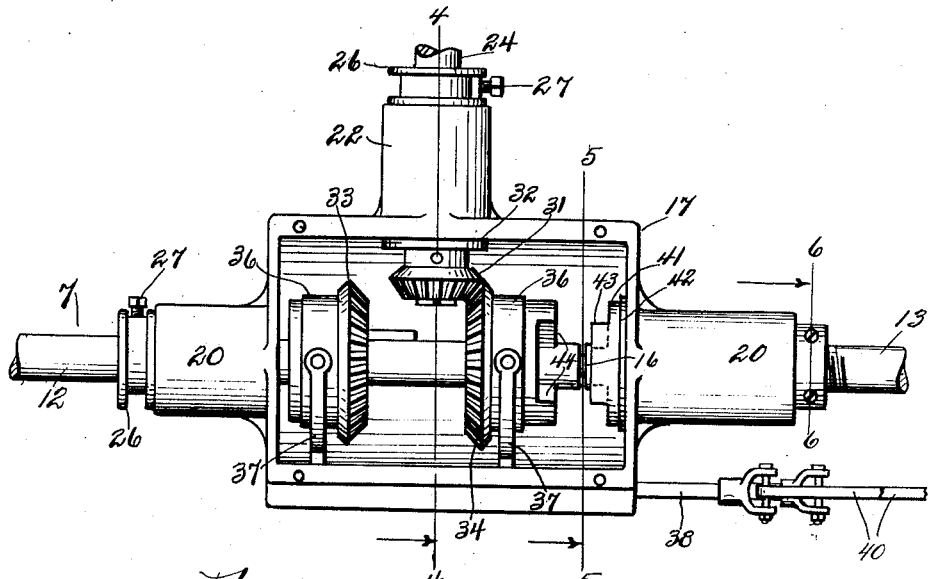
Fig. 2 is a plan view of that portion of the construction illustrated in Fig. 1 which includes the present improvement, but on an enlarged scale, and with a portion of the housing structure removed.

Figs. 4, 5 and 6 are transverse sections taken on the lines 4—4, 5—5, and 6—6, respectively of Fig. 2.

Referring now to the said drawings in detail, these show the improved construction in relation to the main drive shaft 7, of an automobile, extending between the engine 8, transmission 9, and the differential 10, at the rear end of said shaft. We form said shaft 7 in two sections, a front section 12, and a rear section 13, the latter being provided at its front end with a recess 14, in which is mounted a suitable bushing 15, for journaling a reduced portion 16, on the rear end of the front section 12, of the drive shaft. The adjoining ends of the shaft section 12 and 13, are inclosed within a suitable housing 17, which is provided with a cap-piece 18, secured to the body of the housing by by means of bolts 19. At the front and rear ends of the housing 17, are provided bearings 20, in which are mounted suitable roller bearings 21, in engagement with the corresponding end portions of the sections of the shaft 7. At one side of the housing 17, the same is formed with a third bearing 22, provided with roller bearing elements 23, for journaling transverse shaft member 24, having its outer end provided with a suitable power transmitting member 25. The shaft section 12, and the transverse shaft 24, are fitted with roller retaining collars 26, secured by set-screws 27, in position opposite the ends of the bearing 22, and front bearing 21. The outer end of the rear bearing 20 is cored out for receiving a threaded plug 28, which is retained in place by means of a split collar 29, having clamp screws 30, the said collar 29 being threaded for an exact adjustment of the same upon a correspondingly threaded portion of the shaft section 13, opposite the outer end of the plug 28.

Within the housing 17, the inner end of the transverse shaft 24 carries a bevel gear 31, which is fixed to said shaft and abuts against a washer 32, mounted on the shaft 24, at the inner end of the roller bearing elements 23.

Figure 1:
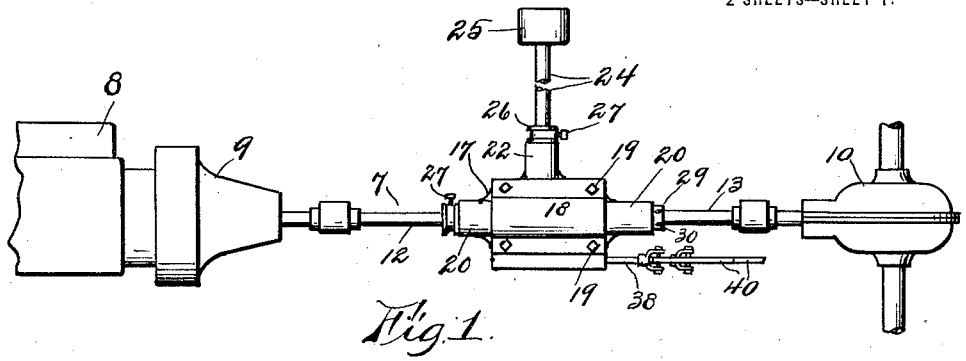
Figure 1 is a plan view showing portions of an automobile engine and transmission, together with a device constructed in accordance with the present invention.
Figure 3:
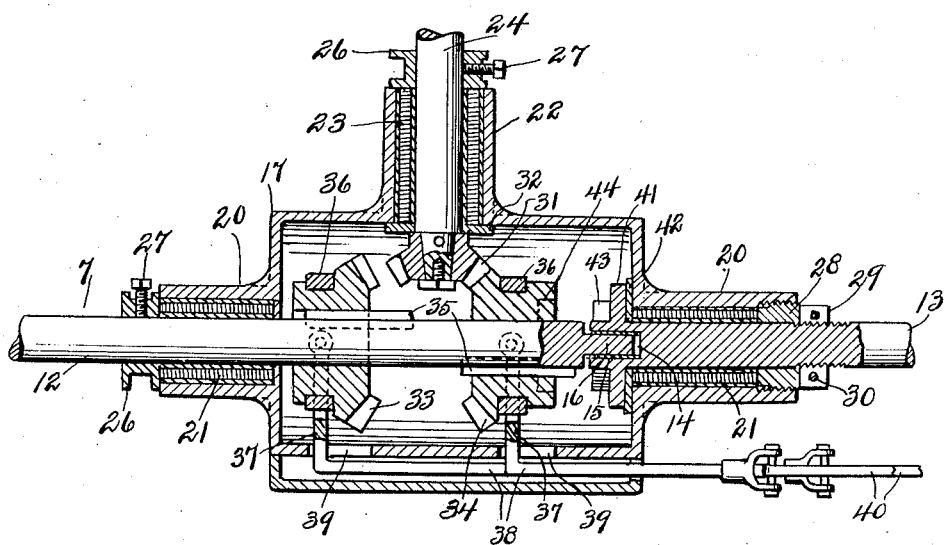
Fig. 3 is a vertical sectional view of the parts shown in Fig. 2.

On opposite sides of the gear 31 are mounted a pair of sliding bevel gears 33 and 34, each adapted to be brought in mesh with the gear 35. Each of the gears 33 and 34 slidingly engages a key 35, on the rear end of the shaft section 12, and is also provided with a yoke collar 36, embracing the hub portion of the gear, and pivotally connected with a yoke 37, having a rod portion 38, extending out through one of a pair of slots 39, and thence rearward into position for operative engagement by one of a pair of levers 40, as illustrated in Figs. 1, 2 and 3.

Within the housing 17, the end of the shaft section 13, is provided with an enlarged head portion 41, between which and the wall of the housing said shaft section carries a washer 42, opposite the inner end of the roller bearings 21. The said head portion 41 is formed with clutch teeth 43, adapted to be brought into clutch relation with similar clutch teeth 44, formed upon the hub portion of the adjacent bevel gear 34, when the latter is shifted rearward toward the head portion 41.

It will thus be apparent that we have provided a simple, practical and efficient construction for embodying the proposed features of improvement. Efficient roller bearing mountings are provided for all the shaft parts which are engaged with the housing structure, and the two sections 13 and 12 of the auto drive shaft 7, are maintained at all times in true and exact alinement by the mounting of the reduced portion 10, within the bushed recess 14, within the front end of the shaft section 13. By the described gear shifting means the gears 33 and 34 may be independently shifted into meshed relation with the gear 31, for driving the latter in opposite directions in an obvious manner, it being understood that whenever the gear 33 is thus meshed the gear 34 is shifted into neutral position intermediate the gear 31, and the clutch teeth 43. Also when the gear 34 is meshed with the gear 31, it will be understood that the gear 33 is shifted into neutral position, as shown in Fig. 3. The gear 34 may be shifted still farther in a rearward direction for clutching its teeth 44, with the teeth 43 on the head portion 41 of the shaft section 33, the shaft key for said gear 34 being of a sufficient length to accommodate these three positions of said gear. When shifted into its rearmost position the gear 34 acts as the drive connection between the two shaft connections 12 and 13, and in this position, of course, the gear 31 remains out of engagement with either of the gears 33 and 34.

While we have illustrated and described what we regard as the preferred form of construction, we desire to reserve the right to make such formal changes as may fairly fall within the scope of the appended claims.

What we claim is:

1. An automobile power transmitting device, comprising a main auto drive shaft, composed of front and rear sections, a housing forming bearings for the sectional portion of said shaft, a transverse shaft having its outer end provided with a power communicating element, and its inner end journaled in said housing and provided with a beveled gear, a pair of separately and independently sliding beveled gears keyed on the front section of said drive shaft within said housing and upon opposite sides of said first gear, and independent gear shifting means for separately moving either of said pair of gears into engagement with said first gear.

2. An automobile power transmitting device comprising a main auto drive shaft composed of front and rear sections, a housing forming bearings for the sectional portion of said shaft, a transverse shaft having its outer end provided with a power communicating element and its inner end journaled in said housing and provided with a bevel gear, a pair of separately and independently sliding beveled gears keyed on the front section of said drive shaft within said housing and upon opposite sides of said first gear, one of the latter gears, and the front end of the rear section of said drive shaft being formed with teeth adapted for clutching engagement, means for shifting said last mentioned gear separately and independently of the remaining gears for engagement with either said rear shaft section or said first named gear, and also into an intermediate neutral position, and means for shifting the other of said pair of gears into engagement with said first named gear independently of the movement of said shaft clutching gear.

3. An automobile power transmitting device comprising a main auto drive shaft composed of front and rear sections, one of said sections formed with a bushing lined recess, and the other of said sections having a reduced end portion journaled in said recess, a housing forming bearings for the sectional portions of said shaft, a transverse shaft having its outer end provided with a power communicating element and its inner end journaled in said housing and provided with a bevel gear, a pair of sliding bevel gears keyed on the front section of said drive shaft within said housing and upon opposite sides of said first gear, one of said sliding gears and the front end of the rear section of said drive shaft being provided with teeth adapted for clutching engagement, and means for moving said sliding gears independently into engagement with said first gear and also for sliding said shaft clutching gear into shaft clutching position.

In witness whereof we hereto affix our signatures.

SAMUEL L. SHUSTER.
GEORGE J. RIEGERT.